(12) United States Patent
Sowerby et al.

(10) Patent No.: US 10,035,716 B1
(45) Date of Patent: Jul. 31, 2018

(54) IMMISCIBLE LIQUID SEPARATOR FOR MARINE VESSELS

(71) Applicant: Goslyn General, LLC, McKinney, TX (US)

(72) Inventors: Giles S. Sowerby, Pagosa Springs, CO (US); John C. Sowerby, Pagosa Springs, CO (US)

(73) Assignee: GOSLYN GENERAL, LLC, McKinney, TX (US)

( * ) Notice: Subject to any disclaimer, the term of this patent is extended or adjusted under 35 U.S.C. 154(b) by 66 days.

(21) Appl. No.: 15/238,885

(22) Filed: Aug. 17, 2016

Related U.S. Application Data

(60) Provisional application No. 62/283,120, filed on Aug. 21, 2015.

(51) Int. Cl.
*B01D 17/032* (2006.01)
*C02F 1/40* (2006.01)
*B01D 17/02* (2006.01)
*C02F 103/32* (2006.01)
*C02F 101/32* (2006.01)

(52) U.S. Cl.
CPC ............ *C02F 1/40* (2013.01); *B01D 17/0208* (2013.01); *B01D 17/0214* (2013.01); *C02F 2101/32* (2013.01); *C02F 2103/32* (2013.01); *C02F 2201/005* (2013.01)

(58) Field of Classification Search
CPC .... B01D 17/0214; C02F 1/40; C02F 2103/32; E03F 5/16
USPC ...................... 210/800, 532.1, 540
See application file for complete search history.

(56) References Cited

U.S. PATENT DOCUMENTS

| | | | | |
|---|---|---|---|---|
| 1,164,527 | A * | 12/1915 | Kelly | C02F 1/40 210/540 |
| 4,406,789 | A * | 9/1983 | Brignon | B01D 17/0214 210/532.1 |
| 5,080,792 | A | 1/1992 | McGovern et al. | |
| 5,149,434 | A * | 9/1992 | Essop | B01D 17/0208 210/540 |
| 6,238,572 | B1 * | 5/2001 | Batten | B01D 17/0214 210/800 |
| 6,413,435 | B1 * | 7/2002 | Kyles | E03F 5/16 210/540 |
| 6,517,715 | B1 * | 2/2003 | Batten | B01D 17/0214 210/540 |
| 7,297,284 | B2 | 11/2007 | Owen et al. | |
| 7,883,620 | B2 | 2/2011 | Owen | |
| 8,900,463 | B2 | 12/2014 | Sowerby et al. | |
| 8,915,380 | B2 | 12/2014 | Sowerby et al. | |

(Continued)

*Primary Examiner* — Christopher Upton
(74) *Attorney, Agent, or Firm* — Roger N. Chauza, PC

(57) ABSTRACT

An immiscible liquid separator for maintaining a desired liquid relationship between an oil spillover and a water spillover irrespective of a tilt angle of the separator. The use of the separator is thus well adapted for use on ships and the like. The separator includes a cylindrical weir having an open top over which separated water spills when waste liquid is drained into the separator. The separator also includes a cylindrical oil stack having an open top over which separated oil spills when waste liquid is drained into the separator. The cylindrical oil stack is located within the cylindrical water weir, thus allowing the separator to function as desired independent of the angle of tilt of the separator.

20 Claims, 4 Drawing Sheets

(56) References Cited

U.S. PATENT DOCUMENTS

2006/0169650 A1* 8/2006 Hirs .................. B01D 17/0214
  210/802
2006/0219629 A1* 10/2006 Noestheden ....... B01D 17/0214
  210/540

* cited by examiner

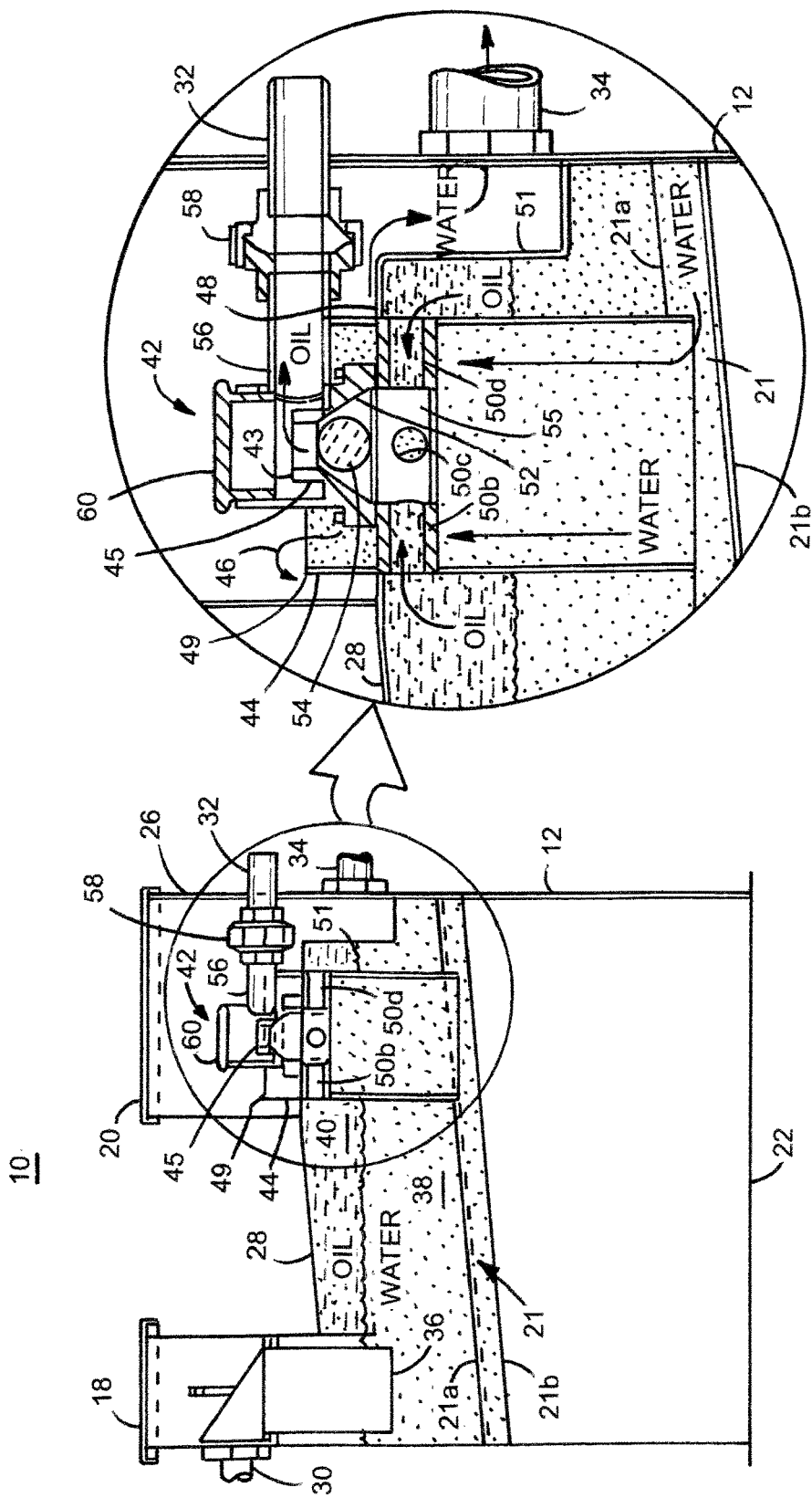

IMMISCIBLE LIQUID SEPARATOR FOR MARINE VESSELS

RELATED APPLICATION

This non-provisional patent application claims the benefit of pending U.S. provisional application filed Aug. 21, 2015, Ser. No. 62/283,120.

TECHNICAL FIELD OF THE INVENTION

The present invention relates in general to apparatus that separates immiscible liquids, and more particularly to water/oil separation apparatus.

BACKGROUND OF THE INVENTION

In several industries, and in particular the food industry, there is a need to separate liquid greases, fats and oils from waste water prior to passing the water to the sewage system. The waste water could be, for example, discharged from a washing device for cleaning dinnerware and cooking utensils. If the greases and fats solidify in the sewage system, a blockage can occur which is expensive to remediate.

It has been found that the liquid wastes from kitchens are often immiscible mixtures of water and oils. As is well known, a first immiscible liquid of one specific gravity will float on a second immiscible liquid having a greater specific gravity. It has also been experimentally determined that the general kitchen waste oils have a specific gravity of about 0.92-0.93, whereas the specific gravity of water is about 1.0. As such, the kitchen oils float on top of the waste water. It has further been determined that in typical immiscible liquid separators, the level of the oil floating on top of the waste water is higher by a calculated distance than the level of the separated waste water itself. The "calculated distance" can be determined for different liquids from prior art teachings. Accordingly, in many prior art immiscible separation units, the highest level of the release valve or oil outlet that releases the oils from the separator is the calculated distance higher than the weir over which the separated waste water flows in order to exit the immiscible liquid separation unit. If the separator is operating within its design limits, then when the proper vertical location of the oil outlet is adhered to, it is assured that the waste water in the separation chamber will not rise sufficiently to inadvertently exit the oil outlet of the separator.

U.S. Pat. No. 7,297,284 by Owen et al., discloses various embodiments of immiscible liquid separators. Described therein are parameters that are important when considering the construction of a separator to separate the oil content from the water content of a waste liquid. Two immiscible liquids of different specific gravities will separate under the force of gravity into two separate layers in a calculable or measurable time period, according to Stokes Law. Typical immiscible liquid separators are constructed with a separation chamber of sufficient size to allow the waste liquid to separate therein, with the oil floating on top of the water. As more waste liquid is added to the separator, the floating oil rises and overflows via an oil outlet into an oil reservoir. The previously separated water flows from the separation chamber under a separator plate into a water chamber where, when the level is sufficiently high, the separated water overflows over a fixed height weir and out of the separator. If the mixture of two immiscible liquids is introduced into the separation chamber at a known flow rate, then the chamber can be sized to ensure that separation is completed before the heavier liquid (water) flows under the separation plate to the separated water chamber.

In the prior art immiscible liquid separators, the weir is often a planar plate that extends laterally between sidewalls of the separator. Thus, when waste liquid influents enter the separator and are separated, the separated waste water flows over the weir and exits the separator and is drained away via the water drainage system. The separated waste water flows over the linear weir much like excess flood water flows over a spillway, dam or levy. This type of immiscible liquid separator works well when fastened to a level floor, or the like, so that the top of the weir is level. If the separator is not level, then the weir can be tilted and the incoming waste liquid influent does not lift the floating oil in the vicinity of the release ball valve sufficiently to allow the oils to be discharged out of the ball valve. In other words, if the liquid separator is tilted in such a way that the water weir is greater than the calculated distance above the oil exit level of the ball valve, then the waste liquids drained into the separator will either not lift the floating oil high enough to exit the ball valve, or will allow the water to rise higher than it should in the separation chamber and exit the oil exit of the separator. Either of these results degrades the operation of the separator unit.

Immiscible liquid separators can be mounted in restaurants, and the like, at desired orientations so as to be level and operate under optimal conditions. However, there are situations where this is not always possible. For example, restaurants and food preparation facilities on ships and other marine vessels are themselves not maintained level, as the ship's pitch and roll motion causes all equipment mounted thereto to move accordingly. As such, the ability to maximally separate the immiscible liquids with conventional separators is compromised. As a result of the constant motion of ships, the waste products are often not processed through immiscible liquid separators, but rather are simply flushed into a holding tank that is emptied when the ship arrives at a port. Under current international rules and regulations, ships cannot dump the holding tanks into the ocean when within about 35 miles of shore. Otherwise, it is a current practice for ships to dump the waste material overboard before reaching the 35-mile limit. Moreover, when ships equipped with holding tanks do empty the waste material at shore facilities, the costs can be significant, as shore facilities must be available to then accept and process the wastes and dispose of the same in an environmentally safe manner. At this point, the fat, oil and grease content of the waste material have degraded to a point where they are not suitable for recycling.

From the foregoing, it can be seen that a need exists for an immiscible liquid disposal system which separates the waste water and oils irrespective of the orientation thereof. Another need exists for an immiscible liquid separator adapted for marine use so that the separated water can be released in the ocean and the oils can be either burned as fuel by the ship engines, or temporarily stored and transferred to a shore facility for sale to a recycling company. A further need exists for an immiscible liquid separator constructed so that the oil outlet level is always the calculated distance above the water outlet level, and is independent of the orientation of the immiscible liquid separator unit.

SUMMARY OF THE INVENTION

In accordance with the principles and concepts of the invention, disclosed is an immiscible liquid separator that is adapted for operation at different angles, such as experienced on ships and other ocean-going vessels. According to a feature of the invention, rather than constructing a separator with an oil discharge outlet spaced from a planar-type water weir, the oil discharge outlet of the invention is a cylindrical oil stack that is surrounded by a cylindrical water weir. With this arrangement, the separated water will raise the level of the separated oil within the separator enclosure and both will be efficiently expelled out of respective outlets, independent of the angle of tilt of the separator.

According to another feature of the invention, the water weir is cylindrical in shape and extends downwardly well within the separated water of the separator chamber, and the cylindrical oil stack is attached concentrically within the cylindrical water weir. The top rim of the cylindrical oil stack is elevated the calculated distance above the top rim of the cylindrical water weir to optimize the separation and expelling of the separated liquids of general kitchen waste liquids from the separator.

A further feature of the invention is the utilization of a ball float type valve that controls the type of liquids that are coupled to the cylindrical oil stack. The ball of the valve is constructed with a material that is buoyant to water, but is not buoyant to oil, whereby when separated water attempts to be coupled to the oil circuit of the cylindrical oil stack, it will be blocked. This prevents the inadvertent coupling of water to the oil discharge outlet.

The ball float type valve is attached at the top thereof to the cylindrical oil stack, and is attached at the bottom of the valve to a base fixture. The base fixture provides oil passages via tubular supports between the bottom of the ball float type valve and to the outside of the cylindrical water weir. The base fixture is connected to the inner ends of the tubular supports, which extend laterally outwardly like spokes of a wheel. The outer ends of the tubular supports are fastened to ports formed in the cylindrical water weir, at a vertical location that is in the layer of separated oil within the separation chamber of the separator enclosure. The separated oil can then enter and flow inwardly through each of the tubular supports, through the base fixture and upwardly through the ball float valve and to the cylindrical oil stack. When waste liquid is drained into the separator, the separated oil is raised on top of the separated water, and overflows over the rim 113 of the cylindrical oil stack and to an oil discharge outlet.

According to an embodiment of the invention disclosed is a separator for separating immiscible liquids, where the separator includes an enclosure having an inlet for coupling an immiscible influent mixture into the enclosure. The immiscible influent mixture includes a first immiscible liquid having a given density, and a second immiscible liquid having a density greater than the density of the first immiscible liquid. The enclosure holds the immiscible influent mixture for a sufficient time so that the first immiscible liquid floats on top of the second immiscible liquid. A first liquid outlet of the enclosure couples the first immiscible liquid out of the enclosure, and a second liquid discharge outlet of the enclosure couples the second immiscible liquid out of the enclosure. Further included is a weir having a cylindrical open top, and an open bottom immersed in the second immiscible liquid. The second immiscible liquid flows over the cylindrical open top of the weir and to the second liquid discharge outlet. A discharge stack has a cylindrical open top. The discharge stack is supported within the weir, whereby the first immiscible liquid flows over the cylindrical open top of the discharge stack to the first liquid outlet.

According to a second embodiment, disclosed is a separator for separating immiscible liquids comprising water and oil. The separator includes an enclosure having a waste liquid inlet, an oil discharge outlet and a water discharge outlet. The enclosure holds the waste liquid input thereto via the waste liquid inlet until the waste liquid separates into an oil content and a water content, with the water content settling to a bottom of the enclosure and the oil content floating on the water content. The enclosure has a top that slants upwardly from a frontal portion of the enclosure to a rear portion of the enclosure, so that a top surface of the oil content engages an inner surface of the slanted top. Included also is a circular cylinder that defines a weir. The weir has an open bottom located near the bottom of the enclosure and an open top located above an uppermost part of the slanted top. The water content flowing over the open top of the weir flows out of the water discharge outlet. A circular cylinder stack has an upper opening defining an overflow of the oil content. The oil content overflowing over the upper opening of the circular cylinder stack is carried to the oil discharge outlet. The circular cylinder stack is located within the circular cylinder weir, and the upper opening of the circular cylinder stack extends in elevation above the open top of the weir. An oil discharge valve allows the oil content to flow to the circular cylinder stack and over the upper opening thereof, but blocks the flow therethrough of the water content.

A further embodiment of the invention disclosed includes a method of separating immiscible liquids including oil and water. The method includes separating an oil content and a water content from a waste liquid. The water content is coupled into a bottom opening of a cylindrical weir so that the water content rises to a rim of a top opening of the cylindrical weir. The oil content is coupled to an oil discharge valve located within the cylindrical weir. When additional waste liquid is added, i) the oil content is forced through the oil discharge valve and over an upper opening of a circular stack where the circular stack is located within the cylindrical weir and where a rim of the upper opening of the circular stack extends above the rim of the top opening of the cylindrical weir, whereby the oil content then flows to an oil discharge outlet, and ii) the water content is forced over the rim of the top opening of the cylindrical weir and to a water outlet.

BRIEF DESCRIPTION OF THE DRAWINGS

Further features and advantages will become apparent from the following and more particular description of the preferred and other embodiments of the invention, as illustrated in the accompanying drawings, in which like reference characters generally refer to the same parts, functions or elements throughout the views, and in which:

FIG. 3 is a cross-sectional view of the immiscible liquid separator system, taken along line 3-3 of FIG. 2;

FIG. 4 is sectional view of an enlarged portion of the immiscible liquid separator system of FIG. 3;

DETAILED DESCRIPTION OF THE INVENTION

Figure 1:
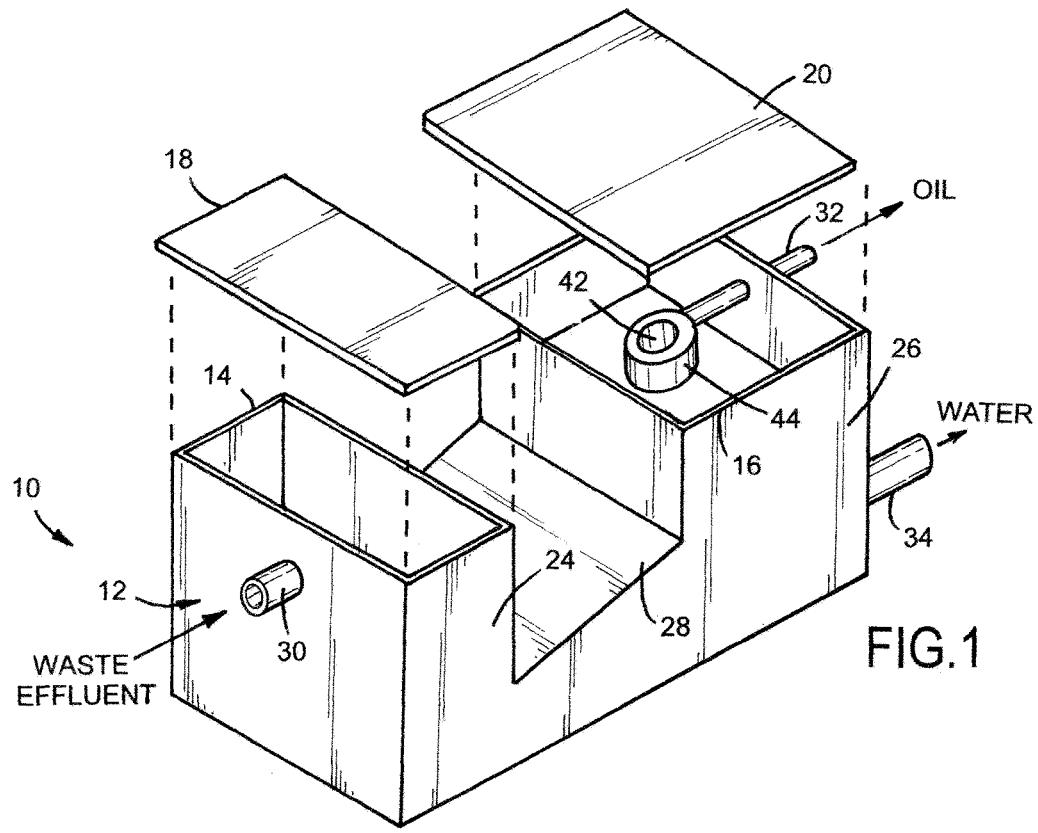
FIG. 1 is an isometric view of an immiscible liquid separator system constructed according to an embodiment of the invention.
Figure 2:
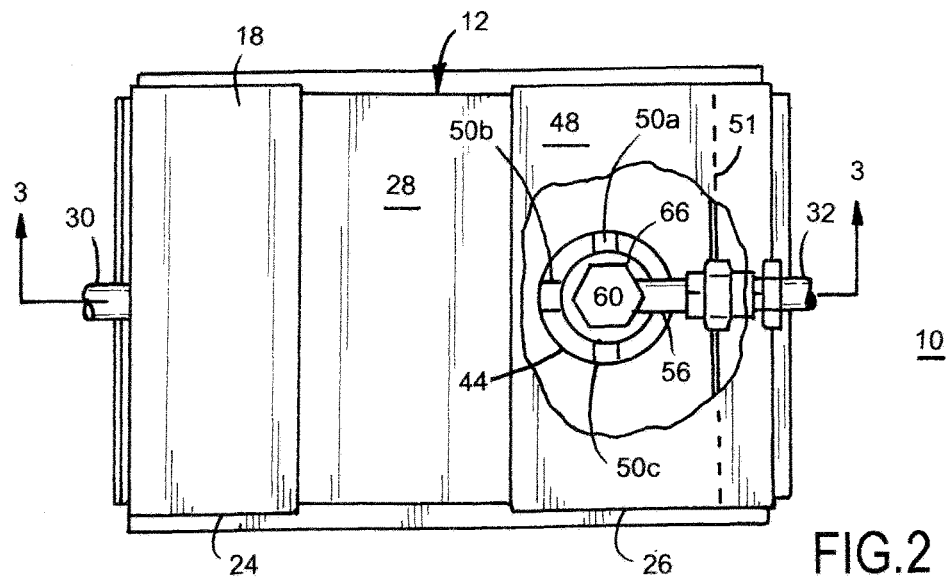
FIG. 2 is a top view of the immiscible liquid separator system of FIG. 1, with the top covers removed.

With reference to FIGS. 1-4, there is illustrated an immiscible liquid separator system adapted for marine use, i.e., use on a marine vessel, or the like. The illustrated immiscible liquid marine separator unit 10 is constructed according to one embodiment of the invention. The immiscible liquid separator 10 is adapted for separating immiscible liquids, such as oils and water commonly produced in food processing facilities. The immiscible liquid separator 10 comprises an enclosure 12 having two open tops 14 and 16 covered by respective lids 18 and 20. The lids 18 and 20 are shoe-box type lids sealed to the rims of the open tops 14 and 16 by neoprene seals. The lids 18 and 20 can be fastened to the enclosure 12 by clips or other quick release fasteners. The immiscible liquid separator 10 also includes a planar bottom 22 adapted for resting on a floor of the vessel or ship. The various side, bottom and lids can be constructed of stainless steel, synthetic or other suitable materials. The tops 14 and 16 or the respective compartments 24 and 26 are constructed with flanges (not shown) therearound to provide an interface with the respective lids 18 and 20. The two lids 18 and 20 are constructed with peripheral down-turned flanges, as shown in FIG. 3.

The immiscible liquid separator 10 is constructed with a false slanted floor 21 that slants from the left side (viewer facing the front of the unit 10 from the waste liquid inlet 30) downwardly to the right side of the unit 10. With this arrangement, particulate solids that are not strained out by the perforated basket 36 settle to the bottom end of the slanted floor 21 and can be periodically flushed out through a silt drain outlet (not shown). The numeral 21a in FIG. 3 is the left side of the false slanted floor 21 where it is sealed and attached to the left vertical wall of the immiscible liquid separator 10. The numeral 21b is the cross-sectional edge of the slanted floor 21, it being understood that FIG. 3 is a cross section taken along line 3-3 of FIG. 2.

The enclosure 12 includes a frontal compartment 24 covered by the lid 18, and includes a rear compartment 26 covered by the lid 20. The frontal compartment 24 is coupled to the rear compartment 26 by an intermediate compartment that has a top 28 which inclines upwardly from the front compartment 24 to the rear compartment 26 of the enclosure 12. To be described below, the frontal compartment 24 is constructed with an influent inlet pipe 30 for allowing kitchen wastes to be drained into the frontal compartment 24. The rear compartment 26 is constructed with two outlets, namely an upper oil discharge outlet pipe 32 and a lower water discharge outlet pipe 34.

Once the waste liquid is drained into the frontal compartment 24 of the enclosure 12, and passed through the perforated basket 36, the mixture of waste oil and water remains in the body of the enclosure 12 for a time sufficient to allow the immiscible liquids to separate in a natural manner. The waste oils 40 of the waste influent have a general specific gravity of between about 0.92 and 0.93. The waste water 38 of the influent has a specific gravity generally of about 1.0. Accordingly, the immiscible liquid with a lower specific gravity (oil) will float on top of the immiscible liquid having a higher specific gravity (water). In other words, the separated oils 40 will gravitate upwardly and eventually float on top of the separated water 38 in the enclosure 12. This action continues to occur whenever new waste liquids are drained into the immiscible liquid separator 10 via the inlet 30. The volume of the enclosure is related to the rate at which waste liquids can be separated into the oil content and the water content. While not shown, a heater is optionally located in the immiscible liquid separator 10 in contact with the oil layer 40 to heat such liquid layer and assure that any fat or grease is maintained in a liquefied state.

The strainer basket 36 is insertable into the frontal compartment 24 via the removed lid 18 to allow the waste liquid drained therein to be strained or filtered. The strainer basket 36 is constructed of a mesh screen or perforated sheet metal to strain particulate matter and allow the remaining liquid waste to drain down into the bottom of the enclosure 12. When full, the strainer basket 36 can be manually removed and emptied and then reinserted into the frontal compartment 24.

In practice, the enclosure 12 contains the lower layer of separated water 38 and an upper layer of oil 40 supported on the slanted floor 21. As noted above, the cover lids 18 and 20 are sealed to the top flanges of the respective openings 14 and 16 by neoprene seals, and thus the enclosure is air tight, except for the inlet and outlet pipes. Any initial air that is in the enclosure is pushed out (by the incoming waste liquid) through either the oil discharge outlet 32 or the water discharge outlet 34. The internal part of the immiscible liquid separator 10 is otherwise not open to the atmosphere. In any event, the separated water 38 (FIGS. 3 and 4) in the bottom of the enclosure 12 rises due to new waste liquids drained into the frontal compartment 24, whereupon the overlying oil layer 40 is pushed upwardly in the enclosure 12. The temporary pressure on the oil layer 40 forces it through an oil discharge valve 42 to exit the enclosure 12 via the oil outlet pipe 32. The separated water 38 exits the enclosure 12 via a water outlet 34. Accordingly, whenever new waste liquids are drained into the immiscible liquid separator 10, a temporary pressure is formed inside the enclosure 12 to force a corresponding amount of liquid out of the separator 10.

The immiscible liquid separator 10 is constructed with a ball float type oil discharge valve 42 for controlling the transfer of oils and liquefied grease out of the immiscible liquid separator 10 via the oil outlet pipe 32. In effect, the oil discharge valve 42 assures that only the lighter specific gravity liquids exit the oil outlet pipe 32, but prevents the separated water 38 from exiting the oil outlet pipe 32. A cylindrical water weir 44 encircles the oil discharge valve 42. In accordance with a feature of the invention, the cylindrical water weir 44 is concentric to and surrounds an annular outlet stack 45 of the valve 42. No matter which direction the immiscible liquid separator 10 tilts due to the corresponding tilt of the ship, there is always a constant vertical distance between some part of the upper rim or edge of the annular stack 45 and some part of the upper rim or edge of the cylindrical water weir 44. Thus, it is assured that whenever waste liquids are drained into the immiscible liquid separator 10 via the influent inlet 30, the floating oil 40 will be pushed out of the oil outlet pipe 32 via the oil discharge ball float valve 42 independent of the tilt angle of the immiscible liquid separator 10.

As noted above, the cylindrical water weir 44 extends down near the bottom of the false slanted floor 21 of the rear compartment 26. The bottom inlet of the cylindrical weir 44 is thus near the bottom of the slanted floor 21 and is thus adapted for allowing only separated water 38 to enter therein, but not oil 40 since the oils have migrated upwardly to the top of the compartment 26 at the location near the rear of the enclosure 12. Thus, only separated water 38 rises in the cylindrical weir 44, as shown in FIG. 4. When kitchen wastes are drained into the immiscible liquid separator 10, the water level in the enclosure 12 rises temporarily until a corresponding amount of separated oil 40 and separated water 38 have been discharged from the immiscible liquid separator 10. Except for a silt discharge valve, there is no other exit for any fluid from the immiscible liquid separator 10 other than the oil outlet 32 and the water outlet 34. During this time the water level in the enclosure 12 rises temporarily and increases the hydraulic pressure therein so that separated water 38 at the bottom of the enclosure 12 flows into the cylindrical weir 44 and overflows over the top rim 49 thereof. The separated water 38 that flows over the rim 49 of the water weir 44 is shown by arrow 46. The separated water 38 that overflows over the cylindrical weir 44 flows down onto the elevated floor 48 and into the trough 51, and then out of the water outlet pipe 34.

Figure 5:
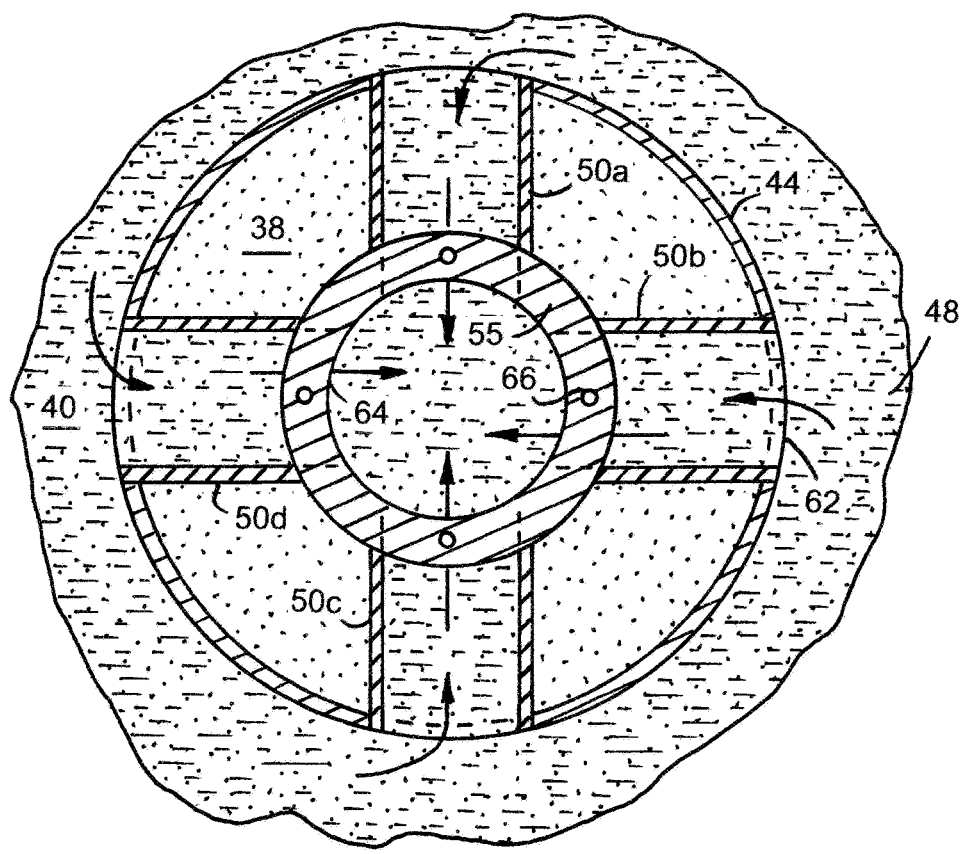
FIG. 5 is a sectional view through the cylindrical water weir and the tubular supports that support the oil discharge valve therein.

The oil discharge valve 42 is fastened centrally within the cylindrical weir 44 to a base fixture 55 with several screws. The base fixture 55 is shown in FIGS. 4 and 5. The oil discharge valve 42 includes a discharge pipe 56 coupled to a union 58. With this construction, the oil discharge valve can be removed from the immiscible liquid separator 10 to either replace or clean the ball 54 and clean the associated seats and surfaces. The base fixture 55 is constructed with four lateral bores, one shown by numeral 66, and each bore is located ninety degrees apart. The four bores 66 open into the center cavity of the base fixture 55 and communicate upwardly to the ball 54 of the oil discharge valve 42. Each of the four lateral bores 66 of the base fixture 55 threadably receive therein a respective inner end of four tubular support members 50a, 50b, 50c and 50d. Alternatively, the inner ends of the four tubular support members 50a-50d can be welded or otherwise fixed in a sealed manner to the bores 66 of the base fixture 55. Each tubular support member 50a-50d extends laterally outwardly like wheel spokes so that the outer ends are connected to respective ports 62 formed in the sidewall of the cylindrical weir 44. The outer ends of the four tubular support members 50a-50d are sealed to the respective ports 62 of the cylindrical weir 44. As will be described below, the four tubular support members 50a-50d carry separated oil 40 laterally inwardly into the base fixture 55, and then upwardly to the oil discharge valve 42. The tubular support members 50a-50d isolate the separated oil 40 from the separated water 38 inside the water weir 44, as the water 38 flows upwardly through the water weir 44 and around the tubular supports 50a-50d.

When additional waste liquid is drained into the enclosure 12 via the inlet 30, the separated water 38 flows upwardly within the cylindrical weir 44 and then over the upper annular rim 49 of the weir 44. As described above, the separated waste water 38 then pours down onto the elevated floor 48 and then into the trough 51 as shown in FIG. 4 and out of the water discharge outlet 34.

With regard to FIG. 5, the cylindrical weir 44 is constructed with four ports, one shown as numeral 62. The separated oil 40 flows through the four ports 62 of the cylindrical weir 44, through the tubular support members 50a-50d and into central cavity 64 of the base fixture 55. The base fixture 55 is shown with four threaded holes for fastening the oil discharge valve 42 thereto. The bottom of the base fixture cavity 64 is capped and thus the separated oil 40 flows upwardly in the cavity 64 to the conical-shaped seat 52 of the oil discharge valve 42. As noted below, the ball 54 is buoyant to water and thus blocks the upward flow of separated water 38, but allows the separated oil 40 to pass around the ball 54 and out of the oil discharge valve 42. The four tubular members 50a-50d are located at an elevation in the upper part of the enclosure 12 near the top of the oil layer 40. Other numbers and shapes of tubular support members 50 can be utilized. The ball 54 is located in the conical-shaped seat 52 and is responsive to the presence of water for rising and closing the liquid path upwardly through the oil discharge valve 42. To that end, the ball 54 of the oil discharge valve 42 is constructed of a material having a specific gravity between that of the separated oil 40 and that of the separated water 38. With this construction, the ball 54 is not buoyant in oil but is buoyant in water. Thus, if the separated water 38 attempts to flow upwardly in the oil discharge valve 42, the ball 54 will float thereon and block the conical-shaped seat 52. Thus, the separated water 38 cannot be discharged out of the oil outlet pipe 32.

When kitchen wastes are drained into the immiscible liquid separator 10, the water level in the separator 10 rises and forces the oil layer 40 upwardly and through the lateral tubular support members 50a-50d and into the base fixture 55 and then upwardly to the conical-shaped ball seat 52 of the oil discharge valve 42. In this case, the ball 54 is not buoyant to oil 40 and thus does not rise, whereupon the oil 40 is pushed upwardly through the ball seat 52 over the rim of the annular oil stack 45 and then laterally through the discharge pipe 56, the pipe union 58, and out of the oil outlet pipe 32. As noted above, at the same time, the separated water 38 is pushed upwardly and over the rim 49 of the cylindrical weir 44, down onto the elevated floor 48 and then into the trough 51 and out of the water outlet pipe 34.

A feature of the invention is that the water weir 44 is a cylinder that is circular shaped, and the oil discharge valve 42 is located centrally therein. Similarly, the annular oil stack 45 is a cylinder that is also circular shaped in cross section. The top of the rim 43 of the annular oil stack 45 is located a calculated and fixed distance above the top of the rim 49 of the cylindrical weir 44. As such, irrespective of the tilt of the immiscible liquid separator 10 with respect to a horizontal reference, there is always one, or two opposite points, on the rim 43 of the annular oil stack 45 that are a constant height above two corresponding opposite points of the rim 49 of the cylindrical weir 44. It can be appreciated that whenever waste liquid is drained into the immiscible liquid separator 10, separated water 38 will not only overflow the cylindrical weir 44, but the water 38 will also lift and cause separated oil 40 to be pushed up and out of the oil discharge valve 42. With this arrangement, it is assured that the proper operation of the immiscible liquid separator 10 is independent of the tilt or angle of the separator 10, in any direction, with respect to a horizontal reference.

A heater (not shown) is located in the bottom of the enclosure 12 to heat the liquids therein so that any fat or grease drained into the immiscible liquid separator 10 is liquefied and can be separated based on density and discharged out of the oil outlet pipe 32. A cap 60 is threaded onto the top threaded opening of the oil discharge valve 42 to block the exit of oil therefrom as well as the escape of thermal energy from the internal space of the enclosure 12. Accordingly, less energy is required to maintain a desired internal temperature in the immiscible liquid separator 10.

Having described the features of the invention, the following will illustrate the enhanced operation of the immiscible liquid separator 10 of the invention, as compared to a prior art separator when operated on a level plane, on a counterclockwise rotated plane and on a clockwise rotated plane.

Figures 6A, 6B:
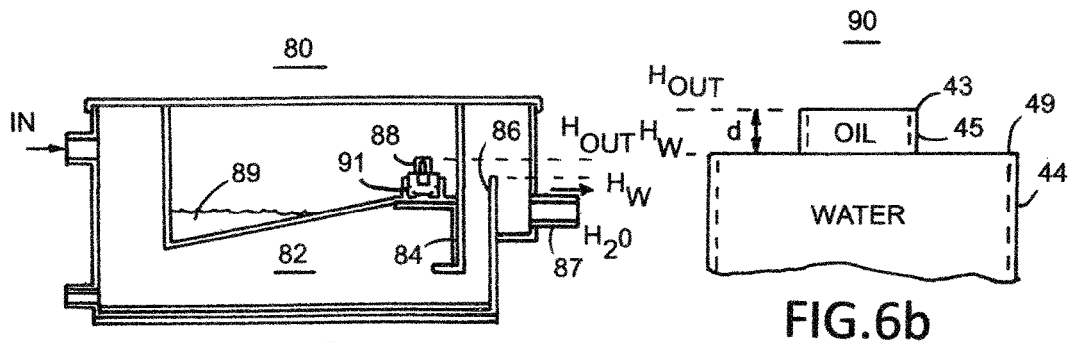
FIGS. 6a and 6b are simplified drawings of a prior art separator and the separator apparatus of the invention, both situated on a level horizontal reference.

With reference to FIGS. 6a and 6b, there are illustrated an immiscible liquid separator 80 constructed according to the prior art, and immiscible liquid separator apparatus 90 constructed according to the invention, both situated on a level horizontal plane. The prior art separator 80 is constructed according to U.S. Pat. No. 7,297,284 by Owen et al., with an enclosure for holding waste liquid 82 that separates into a water content, and an oil content that floats on the water. A planar baffle 84 extends downwardly from the top ceiling of the separator 80 and terminates near the bottom of the separator so that the separated water must pass thereunder when new waste liquid is drained into the separator 80. The separated water then reaches a quiescent level that is at the top of the planar weir 86. Again, when new waste liquid is drained into the separator 80, the separated water level rises and runs over the weir 86 and to the water outlet 87. The separator 80 is equipped with an oil discharge valve 91.

As typical with immiscible liquid separators, the oil separates from the water and floats on top of the water, and thus cannot flow under the baffle 84. Rather, the floating oil reaches a quiescent level that is level with the lowest point of the oil discharge outlet 88 of the oil discharge valve 91. When new waste liquid is drained into the separator 80, a temporary pressure exists, thus lifting the layer of separated oil so that it spills over and out of the oil discharge outlet 88 and into the oil reservoir. The oil reservoir collects the separated oil 89 until full, in which event it can be removed and drained.

The various designated liquid and equipment elevation positions are described next. The level Hw is the height of the planar water weir 86. The height of the water as it flows over the weir 86 is H2. The height of the lowermost opening of the oil discharge outlet is Hout, and the height of the oil (determined as if there was no outlet) is H1. According to Stokes Law, the oil will float on the water, due to the different densities thereof, and when the separated water flows under the baffle 84, it will rise on the right hand side of the baffle 84 to a level that is lower than the separated oil located on the left hand side of the baffle 84. Thus, H1>H2.

With regard to the separator apparatus 90 constructed according to an embodiment of the invention, there is illustrated in FIG. 6b the cylindrical water weir 44 surrounding the cylindrical oil discharge stack 45. The apparatus is situated on a level surface. The rim 43 of the cylindrical stack 45 is the calculated distance higher than the rim 49 of the cylindrical weir 44, and thus whenever waste water is added to the separator 90, the rising level of separated water will lift the separated oil floating thereon up and over the rim 43 of the cylindrical stack 45.

Figures 7A, 7B:
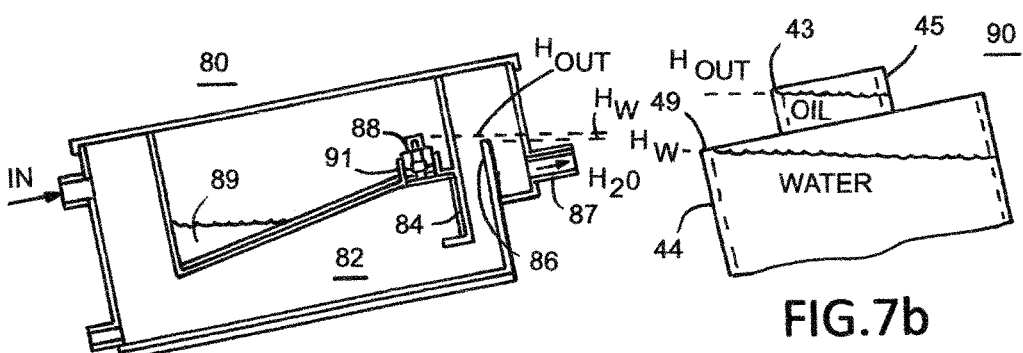
FIGS. 7a and 7b are simplified drawings of the prior art separator and the separator apparatus of the invention, both counterclockwise tilted with respect to a horizontal reference.

FIG. 7a illustrates the conventional separator 80 resting on a surface that has been rotated or tilted in a counterclockwise direction, so that the elevation or distance between the oil discharge outlet 88 is reduced as compared to the elevation of the water weir 86. With this tilt of the separator 80, the distance Hout-Hw is reduced significantly, thus allowing the level of the water to rise higher and near the oil discharge outlet 88. With this tilted condition, the oil valve will not function properly.

FIG. 7b illustrates the separator apparatus 90 tilted counterclockwise to the same extent as that of the conventional separator 80 of FIG. 7a. In this tilted condition, the distance Hout-Hw has not changed significantly, if at all, and thus the operation of the separator apparatus 90 has not been compromised because of the tilted condition.

Figures 8A, 8B:
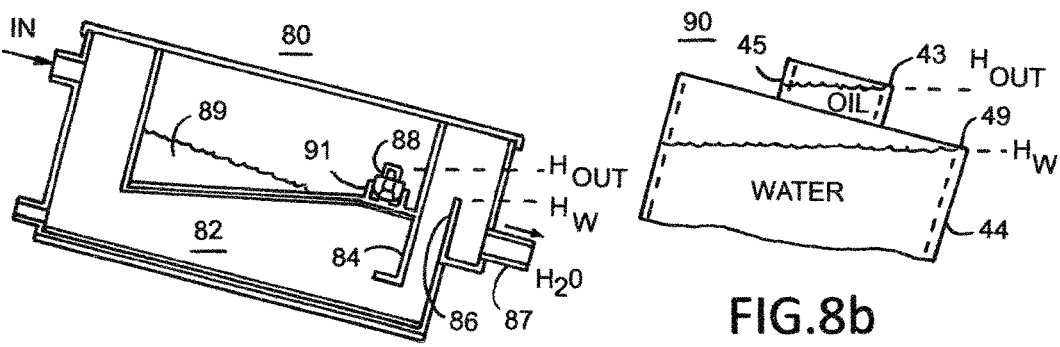
FIGS. 8a and 8b are simplified drawings of the prior art separator and the separator apparatus of the invention, both clockwise tilted with respect to a horizontal reference.

FIG. 8a illustrates the conventional separator 80 resting on a surface that has been rotated or tilted in a clockwise direction, so that the elevation or distance between the oil discharge outlet 88 is increased as compared to the elevation of the water weir 86. With this tilt of the separator 80, the distance Hout-Hw is significantly increased. With this tilted condition, the water level Hw is too low to push oil out of the oil valve 42. The operation of the conventional separator 80 is thus degraded as a result of the tilted condition.

FIG. 8b illustrates the separator apparatus 90 tilted clockwise to the same extent as that of the conventional separator 80. In this tilted condition, the distance Hout-Hw has not changed significantly, if at all, and thus the operation of the separator apparatus 90 has not been compromised because of the tilted condition.

The axes by which the conventional separator 80 and the separator apparatus 90 of the invention extends generally through the waste liquid inlet and the separated water outlet, which are generally located on opposite sides of the respective separators. In practice, the tilt of separators fixed to ships and the like can be in any of the compass directions. However, and while not illustrated herein, the operation of conventional separators 80 is compromised when tilted in any direction, but the operation of the separator apparatus 90 of the invention remains substantially optimal. It can be appreciated that the tilt of separators on ships and other ocean-going vehicles is limited to the extent that such vessel remains upright and floatable to accommodate passengers and crew members. In other words, in practice the tilt of the ship will not approach ninety degrees, as this would be catastrophic to the crew, passengers and cargo. Accordingly, the term tilt as used herein means that tilt that is encountered during normal travel of the vessels.

The cylindrical weir 44 is described above as being annular or circular shaped. As used herein, the term cylindrical is not limited to circular shapes. The annular stack 45 is also described as being circular shaped and concentric within the cylindrical weir 44. However, these shapes are preferred, but are not a necessity. The weir 44 and the annular stack 45 could be formed with other shapes, such as ovals, and other suitable shapes that allow the immiscible liquid separator 10 to operate in various tilted positions, albeit with reduced efficiencies. It is further noted that the entire length of the cylindrical weir 44 need not be cylindrical. Rather, only the top portion of the weir 44 should be cylindrical in shape while the bottom part can be other shapes. It should also be understood that there may be applications where the ball discharge valve 42 can be omitted so that the oil flows through the tubular supports 50a-50d, and upwardly and over the rim 43 of the annular stack 45 to the oil discharge outlet 32.

While the foregoing description describes the immiscible liquid separator 10 in terms of use in separating the oils and water from kitchen waste liquids, other applications are available. For, example, a large scale immiscible liquid separator 10 can be employed on board a ship or other vessel in areas of oil spills. Here, the spilled oil can be gathered up with a boom or other apparatus and pumped to the immiscible liquid separator 10. The oil, and any water that is inadvertently accumulated with the spilled oil can be separated and the water content returned back to the ocean, sea, bay or the like. Another application of use of the invention involves the mounting of the immiscible liquid separator on a conventional grease trap pumper truck that cannot always be parked on level ground. The separator could separate out the grease from the waste liquid for recycling while running the separated water back into the sewer system. This would considerably increase the number of grease traps that could be serviced before the pumper truck had to unload the recovered grease. The principles and concepts of the immiscible liquid separator 10 can also be utilized with other industrial applications.

While the preferred and other embodiments of the invention have been disclosed with reference to a specific immiscible liquid separator, and associated methods thereof, it is to be understood that many changes in detail may be made as a matter of engineering choices without departing from the spirit and scope of the invention, as defined by the appended claims.

What is claimed is:

1. A separator for separating immiscible liquids, comprising:
    an enclosure having an inlet for coupling an immiscible influent mixture into the enclosure, the immiscible influent mixture including a first immiscible liquid having a given density, and a second immiscible liquid having a density greater than the density of the first immiscible liquid, said enclosure holding the immiscible influent mixture for a sufficient time that the first immiscible liquid floats on top of the second immiscible liquid, whereby the first and second immiscible liquids are separated from each other;
    a first liquid outlet of said enclosure for coupling the first immiscible liquid out of said enclosure;
    a second liquid discharge outlet of said enclosure for coupling the second immiscible liquid out of said enclosure;
    a weir having a cylindrical open top, and said weir having an open bottom immersed in the second immiscible liquid, the second immiscible liquid flowing over the cylindrical open top of said weir and to said second liquid discharge outlet;
    a discharge stack supported within said weir, at least one first immiscible liquid passageway isolated from said second immiscible liquid, said first immiscible liquid passageway extending from said first immiscible liquid to said discharge stack; and
    said discharge stack having a cylindrical open top, and the first immiscible liquid flowing from said at least one passageway over the cylindrical open top of said discharge stack and through a conduit to said first liquid outlet so that the first immiscible liquid remains separated from the second immiscible liquid.

2. The separator of claim 1, wherein said enclosure is sealed so that when the immiscible influent mixture is drained into said enclosure, the first and second immiscible liquids are momentarily pressurized.

3. The separator of claim 1, further including a ball float type valve that is connected to said weir by one or more said first immiscible liquid passageways, each said liquid passageway comprises a tubular member that carries the first immiscible liquid from outside said weir to said discharge valve.

4. The separator of claim 3, wherein said discharge stack is supported within said weir by one or more said liquid passageways that carry the first immiscible liquid from outside said weir to said discharge valve which is supported within said discharge stack.

5. The separator of claim 4, wherein an inlet to each said one or more liquid passageways is located at an elevation in said enclosure occupied by the first immiscible liquid which floats on said second immiscible liquid.

6. The separator of claim 4, wherein said discharge valve includes a ball constructed with a material having a density greater than a density of said first immiscible liquid and said material has a density less than a density of said second immiscible liquid.

7. The separator of claim 1, wherein a top rim of the cylindrical open top of said discharge stack is located at an elevation higher than a top rim of the cylindrical open top of said weir by a predetermined distance.

8. The separator of claim 7, wherein said elevation between a top point of said cylindrical open top of said weir and a top point of said cylindrical open top of said discharge stack is independent of the tilt of said separator with respect to a horizontal reference.

9. The separator of claim 1, wherein said cylindrical open top of said discharge stack is concentric with said cylindrical open top of said weir.

10. The separator of claim 1, wherein during operation of said separator there are no first immiscible liquids inside a top portion of said weir.

11. The separator of claim 1, wherein said weir is a circular cylinder with a uniform diameter throughout an axial length thereof, said weir having plural ports in a sidewall thereof, each said port located at the same elevation on said weir;
    a plurality of said liquid passageways, where each said liquid passageway comprises a tubular support, each said tubular support having one outer end connected to a respective said weir port;
    a base having plural ports therein, each said tubular support having one inner end connected to a respective said base port, said base having a central cavity;
    a ball float type valve connected to said base, said ball float type valve in liquid communication with the central cavity of said base; and
    whereby the first immiscible liquid flows from outside said weir through said one or more tubular supports, to the central cavity of said base and then to said ball float type valve.

12. The separator of claim 11, wherein the second immiscible liquid flows upwardly and inside said weir and around outside surfaces of said one or more tubular supports and to said cylindrical open top of said weir.

13. A separator for separating immiscible liquids comprising water and oil, said separator comprising:
    an enclosure having a waste liquid inlet, an oil discharge outlet and a water discharge outlet, said enclosure for holding a waste liquid input thereto via said waste liquid inlet until the waste liquid separates into an oil content and a water content, the water content settling to a bottom of said enclosure and the oil content floating on the water content;
    said enclosure having a top that slants upwardly from a frontal portion of said enclosure to a rear portion of said enclosure, a top surface of the oil content engaging an inner surface of said slanted top;
    a circular cylinder defining a weir, said weir having an open bottom located near the bottom of said enclosure, and said weir having an open top located above an uppermost part of said slanted top, the water content flowing over the open top of said weir flows out of said water discharge outlet;
    a circular cylinder stack having an upper opening defining an overflow for the oil content, the oil content overflowing over the upper opening of said circular cylinder stack is carried to said oil discharge outlet;

said circular cylinder stack located within said circular cylinder weir, and the upper opening of said circular cylinder stack extends in elevation above the open top of said weir;

an oil discharge valve for allowing the oil content to flow to said circular cylinder stack and over the upper opening thereof, but blocking the flow therethrough of the water content; and at least one tubular passageway coupling the oil content from outside said circular cylinder weir to said oil discharge valve.

14. The separator of claim 13, wherein said circular cylinder stack houses said oil discharge valve.

15. The separator of claim 14, further including a base fixture having a central cavity and plural lateral ports, said base fixture fixed to said oil discharge valve;

plural said tubular passageways, each said tubular passageway of said plurality having an inner end attached to one said lateral port of said base fixture, and each said tubular passageway having an outer end sealed to a respective port formed in a sidewall of said circular cylindrical weir; and whereby the oil content in said enclosure flows through the plural tubular passageways into the cavity of said base fixture and upwardly to said oil discharge valve and then over the upper opening of said circular cylindrical stack to the oil discharge outlet.

16. The separator of claim 15, wherein said oil discharge valve is a ball float type valve and is removably attached to said base fixture to gain access to a ball of said ball float type valve.

17. The separator of claim 13, wherein said enclosure is sealed so that when the waste liquid is drained into said enclosure, the oil contend and the water content are momentarily pressurized.

18. A method of operating a separator for separating immiscible liquids including oil and water, said method comprising:

separating an oil content and a water content from a waste liquid input into the separator;

coupling the water content into a bottom opening of a cylindrical weir, the water content rising in said cylindrical weir and upwardly to a rim of a top opening of said cylindrical weir;

coupling the oil content to an oil discharge valve located within said cylindrical weir; and when additional waste liquid is added to the separator, i) forcing the oil content through the oil discharge valve and over an upper opening of a circular stack where said circular stack is located within said cylindrical weir and where a rim of the upper opening of said circular stack extends above the rim of the top opening of said cylindrical weir, the oil content then flowing to an oil discharge outlet, and ii) forcing the water content over the rim of the top opening of said cylindrical weir and to a water outlet.

19. The method of claim 18, further including maintaining a liquid relationship with respect to said circular stack and said circular weir irrespective of a tilt of the separator with regard to a horizontal reference.

20. The method of claim 18, further including coupling the oil content located outside said cylindrical weir to said oil discharge valve via one or more tubular members.

* * * * *